United States Patent
Au et al.

(10) Patent No.: US 10,903,963 B2
(45) Date of Patent: Jan. 26, 2021

(54) SYSTEM AND METHOD FOR ADAPTIVE TTI COEXISTENCE WITH LTE

(71) Applicant: Huawei Technologies Co., Ltd., Shenzhen (CN)

(72) Inventors: Kelvin Kar Kin Au, Kanata (CA); Liqing Zhang, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/266,947

(22) Filed: Feb. 4, 2019

(65) Prior Publication Data

US 2019/0173599 A1 Jun. 6, 2019

Related U.S. Application Data

(63) Continuation of application No. 14/582,951, filed on Dec. 24, 2014, now Pat. No. 10,200,137.
(Continued)

(51) Int. Cl.
  *H04L 5/00* (2006.01)
  *H04W 72/04* (2009.01)
  *H04L 5/22* (2006.01)

(52) U.S. Cl.
  CPC .......... *H04L 5/0053* (2013.01); *H04L 5/0005* (2013.01); *H04L 5/0094* (2013.01);
  (Continued)

(58) Field of Classification Search
  None
  See application file for complete search history.

(56) References Cited

U.S. PATENT DOCUMENTS

| 6,876,637 B1 | 4/2005 | Belaiche et al. |
| 2007/0047495 A1 | 3/2007 | Ji et al. |

(Continued)

FOREIGN PATENT DOCUMENTS

| CA | 2714968 A1 | 8/2009 |
| CA | 2779939 A1 | 5/2011 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 v11.5.0, Sep. 2013, 347 pages.
(Continued)

*Primary Examiner* — Yaotang Wang
(74) *Attorney, Agent, or Firm* — Slater Matsil, LLP

(57) ABSTRACT

System and method embodiments are disclosed to provide mechanisms wireless communications. A method comprises transmitting, by a network device to a non-long term evolution (LTE) user equipment (UE), a bandwidth partitioning information describing a non-LTE bandwidth partition of a system bandwidth. The system bandwidth comprises an LTE bandwidth partition coexisting with the non-LTE bandwidth partition in the system bandwidth, and the LTE bandwidth partition is within the non-LTE bandwidth partition or the LTE bandwidth partition is adjacent to the non-LTE bandwidth partition.

24 Claims, 10 Drawing Sheets

Related U.S. Application Data

(60) Provisional application No. 61/921,168, filed on Dec. 27, 2013.

(52) U.S. Cl.
CPC ........... *H04W 72/042* (2013.01); *H04L 5/001* (2013.01); *H04L 5/0007* (2013.01); *H04L 5/0014* (2013.01); *H04L 5/22* (2013.01); *H04W 72/0446* (2013.01)

(56) References Cited

U.S. PATENT DOCUMENTS

| | | | |
|---|---|---|---|
| 2009/0103447 A1 | 4/2009 | Harada et al. | |
| 2009/0199490 A1 | 8/2009 | Hockham | |
| 2009/0245188 A1 | 10/2009 | Fukuoka et al. | |
| 2010/0113041 A1* | 5/2010 | Bienas | H04W 48/10 455/450 |
| 2010/0211845 A1 | 8/2010 | Lee et al. | |
| 2013/0163555 A1* | 6/2013 | Turtinen | H04W 76/14 370/330 |
| 2013/0194951 A1 | 8/2013 | Kim et al. | |
| 2013/0242889 A1 | 9/2013 | Khoryaev et al. | |
| 2013/0272130 A1* | 10/2013 | Zhang | H04L 47/29 370/235 |
| 2013/0301524 A1* | 11/2013 | Xu | H04W 48/12 370/328 |
| 2014/0036853 A1* | 2/2014 | Kim | H04W 16/14 370/329 |
| 2014/0071954 A1 | 3/2014 | Au et al. | |
| 2014/0369242 A1* | 12/2014 | Ng | H04L 5/0098 370/280 |
| 2018/0152269 A1 | 5/2018 | Xiong et al. | |

FOREIGN PATENT DOCUMENTS

| | | |
|---|---|---|
| CN | 101119153 A | 2/2008 |
| CN | 101141178 A | 3/2008 |
| CN | 101292456 A | 10/2008 |
| CN | 101480098 A | 7/2009 |
| CN | 101667985 A | 3/2010 |
| CN | 102065561 A | 5/2011 |
| EP | 2015601 A1 | 1/2009 |
| EP | 2665219 A1 | 11/2013 |
| EP | 1938493 B1 | 10/2014 |
| JP | 2007300510 A | 11/2007 |
| JP | 2009506679 A | 2/2009 |
| KR | 20090035472 A | 4/2009 |
| RU | 2462823 C2 | 9/2012 |
| WO | 2007025160 A2 | 3/2007 |
| WO | 2008131262 A1 | 10/2008 |

OTHER PUBLICATIONS

Nokia Siemens Networks, "Improvements to EUL Coverage",3GPP TSG TAN WG1 Meeting #72, R1-130675, Jan.-Feb. 2013, 4 pages, St. Julians, Malta.

NTT Docomo, Inc., "Variable TTI Length Control", 3GPP TSG RAN WG2, Ad Hoc on LTE, R2-061921, Jun. 2006, 3 pages, Cannes, France.

NTT Docomo, "Physical Channel Structures for Evolved UTRA," 3GPP TSG RAN WG1 Meeting #41, R1, -050464, Athens, Greece, May 9-13, 2005, 13 pages.

Huawei et al.; "Co-existence of 2ms and 10ms TTI," 3GPP TSG RAN WG1 #66, R1-112186, Aug. 22-26, 2011, pp. 1-3, Athens, Greece.

Intel Corporation, "On New Carrier Types: Carrier Segments and backward compatible support," 3GPP TSG RAN WG1 Meeting #67, R1-113953, San Francisco, CA, Nov. 14-18, 2011, 4 pages.

NTT Docomo, Inc., "Variable TTI Length Control," 3GPP TSG RAN WG2 Ad Hoc on LTE, R2-061921, Jun. 27-30, 2006, 4 pages.

* cited by examiner

SYSTEM AND METHOD FOR ADAPTIVE TTI COEXISTENCE WITH LTE

This application is a continuation of U.S. patent application Ser. No. 14/582,951, now U.S. Pat. No. 10,200,137, filed on Dec. 24, 2014 and entitled "System and Method for Adaptive TTI Coexistence with LTE," which claims benefit to U.S. Provisional Application No. 61/912,168 filed on Dec. 27, 2013 and entitled "System and Method for Adaptive TTI Coexistence with LTE," which applications are hereby incorporated herein by reference as if reproduced in their entireties.

TECHNICAL FIELD

The present invention relates to wireless communications, and, in particular embodiments, to a system and method for adaptive transmission time interval (TTI) coexistence with Long Term Evolution (LTE).

BACKGROUND

In wireless communication systems such as Long Term Evolution (LTE), one of the fundamental parameters of the frame structure is the transmission time interval (TTI). The TTI is a parameter related to encapsulation of data from higher layers into frames for transmission on the radio link layer. The TTI refers to the duration of a transmission on the radio link, and is related to the size of the data blocks passed from the higher network layers to the radio link layer. The length of time required to transmit one such block determines the TTI. As wireless networking migrates to fifth generation (5G) systems, there is a need for ensuring coexistence of the existing LTE systems and the new 5G systems, including the use of the TTI.

SUMMARY OF THE INVENTION

In accordance with an embodiment method, a network device transmits to a non-long term evolution (LTE) user equipment (UE) a bandwidth partitioning information describing a non-LTE bandwidth partition of a system bandwidth. The system bandwidth comprises an LTE bandwidth partition coexisting with the non-LTE bandwidth partition in the system bandwidth, and the LTE bandwidth partition is within the non-LTE bandwidth partition or the LTE bandwidth partition is adjacent to the non-LTE bandwidth partition. The non-LTE bandwidth partition may comprise a first non-LTE bandwidth partition and a second non-LTE bandwidth partition. The first non-LTE bandwidth partition may be associated with a first transmission time interval (TTI) length, and the second non-LTE bandwidth partition may be associated with a second TTI length that is different than the first TTI length. The LTE bandwidth partition may be associated with an LTE TTI length that is different from any one of the first TTI length and the second TTI length. The first non-LTE bandwidth partition, the second non-LTE bandwidth partition, and the LTE bandwidth partition may each occupy a different frequency partition in the system bandwidth. One of the first TTI length or the second TTI length may be a default TTI length. The network device may communicate data, between the network device and the non-LTE UE, using the first TTI length in a first time interval, or using the second TTI length in a second time interval.

In accordance with another embodiment, a network device comprises at least one processor and a non-transitory computer readable storage medium storing programming for execution by the at least one processor. The programming includes instructions to transmit to a non-long term evolution (LTE) user equipment (UE) a bandwidth partitioning information describing a non-LTE bandwidth partition of a system bandwidth. The system bandwidth comprises an LTE bandwidth partition coexisting with the non-LTE bandwidth partition in the system bandwidth, and the LTE bandwidth partition is within the non-LTE bandwidth partition or the LTE bandwidth partition is adjacent to the non-LTE bandwidth partition. The non-LTE bandwidth partition may comprise a first non-LTE bandwidth partition and a second non-LTE bandwidth partition. The first non-LTE bandwidth partition may be associated with a first transmission time interval (TTI) length, and the second non-LTE bandwidth partition may be associated with a second TTI length that is different than the first TTI length. The LTE bandwidth partition may be associated with an LTE TTI length that is different from any one of the first TTI length and the second TTI length. The first non-LTE bandwidth partition, the second non-LTE bandwidth partition, and the LTE bandwidth partition may each occupy a different frequency partition in the system bandwidth. One of the first TTI length or the second TTI length may be a default TTI length. The programming may further comprise instructions to communicate data, between the network device and the non-LTE UE, using the first TTI length in a first time interval, or using the second TTI length in a second time interval.

In accordance with an embodiment method, a network device transmits to a long term evolution (LTE) user equipment (UE) a bandwidth partitioning information describing an LTE bandwidth partition of a system bandwidth. The system bandwidth comprises a non-LTE bandwidth partition coexisting with the LTE bandwidth partition in the system bandwidth, and the LTE bandwidth partition is within the non-LTE bandwidth partition or the LTE bandwidth partition is adjacent to the non-LTE bandwidth partition. The non-LTE bandwidth partition may comprise a first non-LTE bandwidth partition and a second non-LTE bandwidth partition. The first non-LTE bandwidth partition may be associated with a first transmission time interval (TTI) length, and the second non-LTE bandwidth partition may be associated with a second TTI length that is different than the first TTI length. The LTE bandwidth partition may be associated with an LTE TTI length that is different from any one of the first TTI length and the second TTI length. The first non-LTE bandwidth partition, the second non-LTE bandwidth partition, and the LTE bandwidth partition each occupy a different frequency partition in the system bandwidth. The network device may communicate data, between the network device and the LTE UE, using the LTE TTI length. The bandwidth partitioning information may be transmitted by higher layer signaling.

In accordance with an embodiment, a network device comprises at least one processor and a non-transitory computer readable storage medium storing programming for execution by the at least one processor. The programming includes instructions to transmit to a long term evolution (LTE) user equipment (UE) a bandwidth partitioning information describing an LTE bandwidth partition of a system bandwidth. The system bandwidth comprises a non-LTE bandwidth partition coexisting with the LTE bandwidth partition in the system bandwidth, and the LTE bandwidth partition is within the non-LTE bandwidth partition or the LTE bandwidth partition is adjacent to the non-LTE bandwidth partition. The non-LTE bandwidth partition may comprise a first non-LTE bandwidth partition and a second non-LTE bandwidth partition. The first non-LTE bandwidth partition may be associated with a first transmission time interval (TTI) length, and the second non-LTE bandwidth partition may be associated with a second TTI length that is different than the first TTI length. The LTE bandwidth partition may be associated with an LTE TTI length that is different from any one of the first TTI length and the second TTI length. The first non-LTE bandwidth partition, the second non-LTE bandwidth partition, and the LTE bandwidth partition each occupy a different frequency partition in the system bandwidth. The may comprise further instructions to communicate data, between the network device and the LTE UE, using the LTE TTI length. The bandwidth partitioning information may be transmitted by higher layer signaling.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
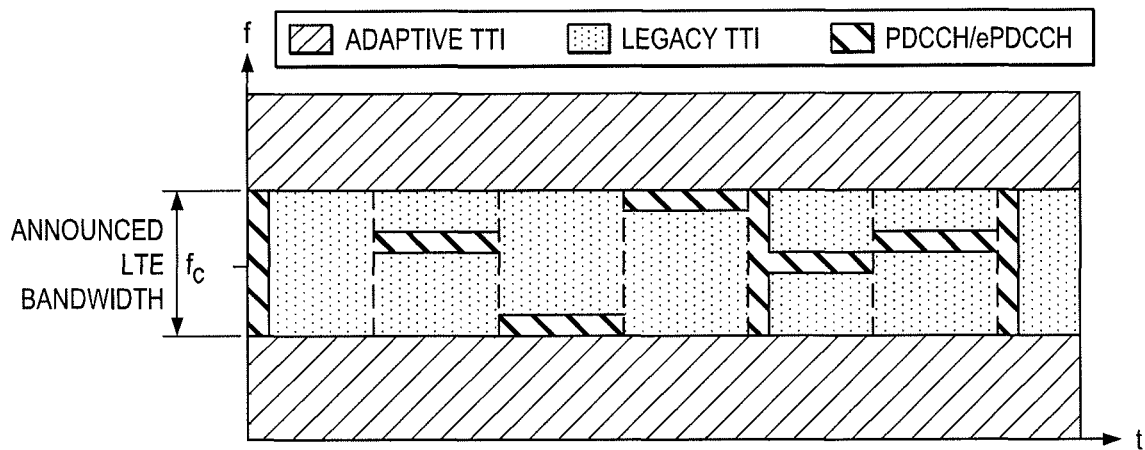
FIG. 1 illustrates an embodiment of an adaptive TTI intra-carrier coexistence mechanism.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In U.S. patent application Ser. No. 13/611,823, entitled "System and Method for Adaptive Transmission Time Interval (TTI) Structure," and filed Sep. 12, 2012, an adaptive transmission time interval (TI) structure for 5G wireless networks is described. In embodiments of this invention, the "5G" described herein are referred to as Futurewei wireless network technologies, for example, a future cellular wireless network which does not have a cell-ID for the cells in the network. The adaptive TTI capability means that 5G UEs become capable of using different TTI lengths in the same bandwidth. The adaptive TTI balances latency and dynamic control signaling overhead to accommodate diverse traffic types. The adaptive TTI system focuses on the framework of supporting simultaneously different TTI lengths in a 5G system, which provides the opportunity for adapting the associated control signaling overhead for different conditions. In light of the need for coexistence of existing LTE systems and new 5G systems, an adaptive TTI structure needs to coexist with the legacy LTE TTI structure, such as in the case when LTE spectrum is re-farmed (re-arranged) to support 5G systems. Unlike the case of 5G, in the LTE TTI structure, legacy or existing LTE UEs may only be capable of using a designated TTI length. The terms legacy LTE or LTE are used herein interchangeably to refer to systems (network-end components and user-end terminals) that do not support the adaptive TTI mechanism (do not have the capability to use different TTI lengths). the terms UE and terminal are used herein interchangeably to refer to any user-end device that communicates using wireless links with the network. Examples of UEs and terminals include smartphones, laptop computers, tablet computers, sensor devices, or other wireless communications enabled devices.

Disclosed herein are embodiments of mechanisms that allow the adaptive TTI mechanism to coexist with legacy LTE TTI. The embodiments include schemes for adaptive TTI to coexist with legacy TTI in the same carrier, and schemes for coexistence in a new carrier type. A carrier is a frequency range or bandwidth defined in the system for exchanging wireless communications between the network and the terminals. The coexistence mechanism allows a migration path of an existing LTE system to the 5G system supporting adaptive TTI, such as for the re-farming of LTE spectrum for 5G. Each of the LTE and 5G systems may include user-end terminals and network-end devices configured to support the corresponding system's resources and capabilities. For instance, the coexistence of adaptive TI with legacy TTI allows a network to serve legacy LTE and 5G terminal devices (e.g., a plurality of user equipment (UEs)) in the same system. The coexistence also allows a network to serve 5G terminals of different categories, such as where not all 5G terminals are expected to support adaptive TTI. For instance, low cost terminals and terminals supporting only specific traffic types (e.g., sensor devices or devices in machine-to-machine communications) can be configured to support a single TTI length. The mechanisms can also provide a gradual migration path to an adaptive TTI frame structure. The mechanisms can be implemented in the wireless network infrastructure (e.g., at base stations (eNB) or lower power nodes (Femto or pico cells)) and in UEs or other terminal (end user) devices.

The embodiment mechanisms for adaptive TTI coexistence may use intra-carrier configuration, that is within the same carrier (e.g., same frequency band), and/or inter-carrier configuration with a new carrier type. In such scenarios, the legacy or existing LTE UEs that do not support adaptive TTI do need to be aware of the new TTI structure, since they can fail to decode the control channels where adaptive TTI exists. The 5G UEs capable of adaptive TTI are configured with adaptive TTI, for instance by receiving and decoding the configuration information at an associated higher layer.

FIG. 1 illustrates an embodiment of an adaptive TTI intra-carrier coexistence mechanism. The intra-carrier coexistence mechanism allows coexistence of an LTE and 5G systems (with LTE and 5G UEs) in the same carrier (frequency band). For example, the LTE and 5G UEs can connect to a same network using the same carrier. This configuration is transparent to legacy LTE UEs in the system (the legacy LTE UEs are unaware of the adaptive TTI). In this configuration, the LTE control channels resource mapping is distributed over the entire bandwidth. As shown in FIG. 1, the legacy LTE TTI occurs in resources centered around the carrier with a bandwidth determined by the network. The adaptive TTI partition occurs on the rest of the resources over the actual system bandwidth. The 5G terminals (e.g., UEs or other terminal devices) that may not support adaptive TTI are configured with a default TTI length. This TTI length can be included in the set of the adaptive TTIs, and can be shared between adaptive-TTI-capable and non-capable 5G terminals.

In an embodiment, in the legacy LTE system, the network broadcasts the actual bandwidth in LTE system information messages. The network maps the LTE control and data channels to resources within this bandwidth. In the adaptive TTI system, the network broadcasts the adaptive TTI bandwidth partitioning information to 5G terminals.

Figure 2:
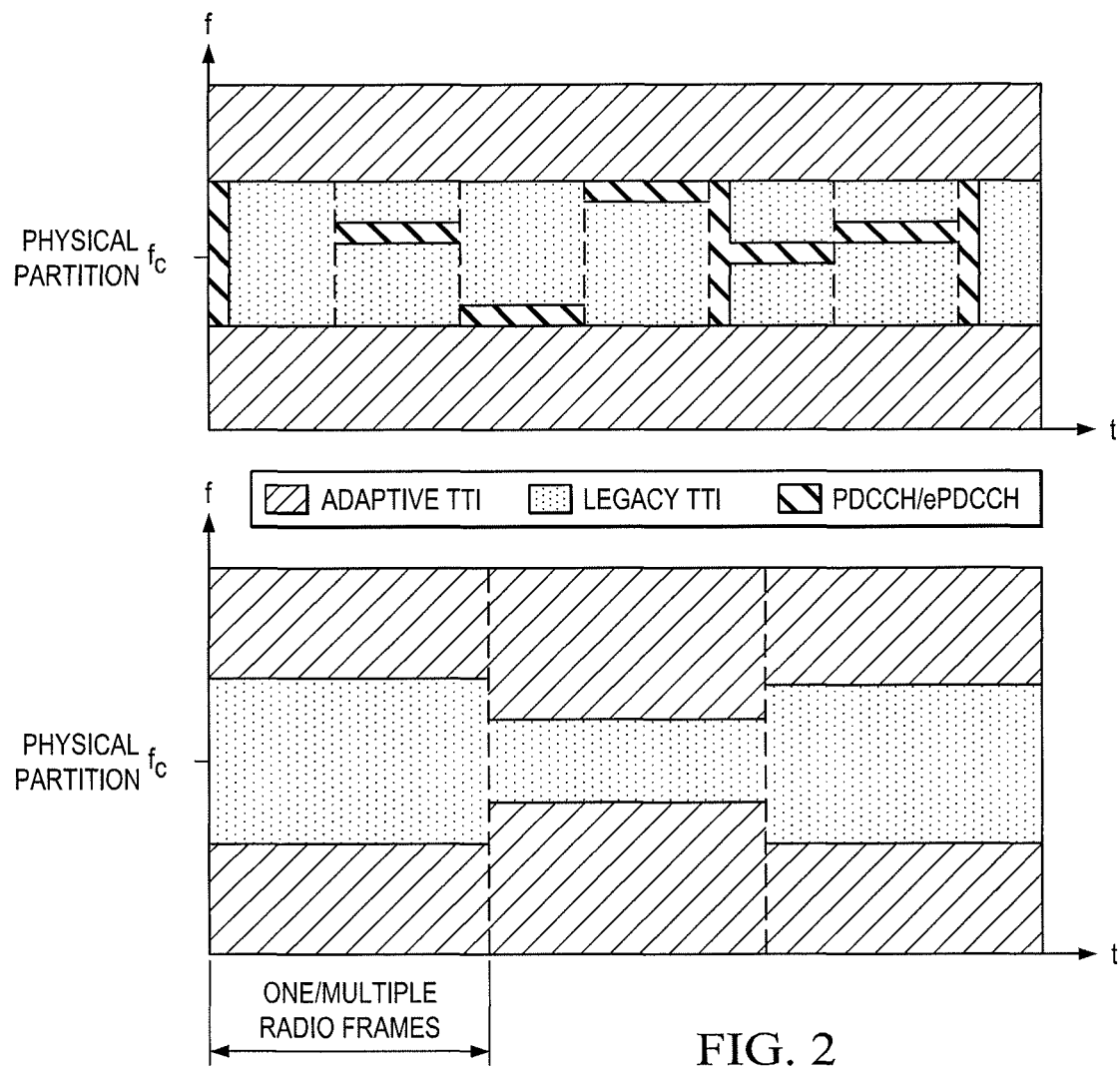
FIG. 2 illustrates an embodiment of an adaptive TTI intra-carrier coexistence mechanism using frequency division multiplexing (FDM)

FIG. 2 illustrates an embodiment of an adaptive TTI intra-carrier coexistence mechanism using frequency division multiplexing (FDM). In this scenario, the adaptive TTI and legacy LTE TTI coexist in an FDM manner, where the system bandwidth is partitioned into adaptive TTI and legacy (LTE) TTI portions. The legacy TTI partition is centered around a carrier frequency, $f_c$. Assuming a total system bandwidth, $B_T$, and a legacy TTI bandwidth, $B_L$, the network advertises $B_L$ in system information messages to legacy terminals. Using FDM, $B_L$ can vary over time, e.g., over one or multiple radio frames. In an embodiment, the network places a physical downlink control channel (PDCCH) and/or enhanced PDCCH (ePDCCH) in the bandwidth for legacy UEs. The legacy UEs can decode blindly the PDCCH and/or ePDCCH over the system bandwidth $B_L$.

The bandwidth partitioning ratio for adaptive TTI and legacy TTI can be adjusted over time, for instance by considering the number of legacy UEs vs. the number for 5G terminals. The legacy system bandwidth change can be communicated to legacy terminals via a system information change procedure, e.g., a paging message. Bandwidth partitioning information can be communicated to 5G terminals via higher layer signaling, for instance, semi-statically such as in an interval of one or multiple radio frames (e.g., of 10 millisecond (ms)).

Figure 3:
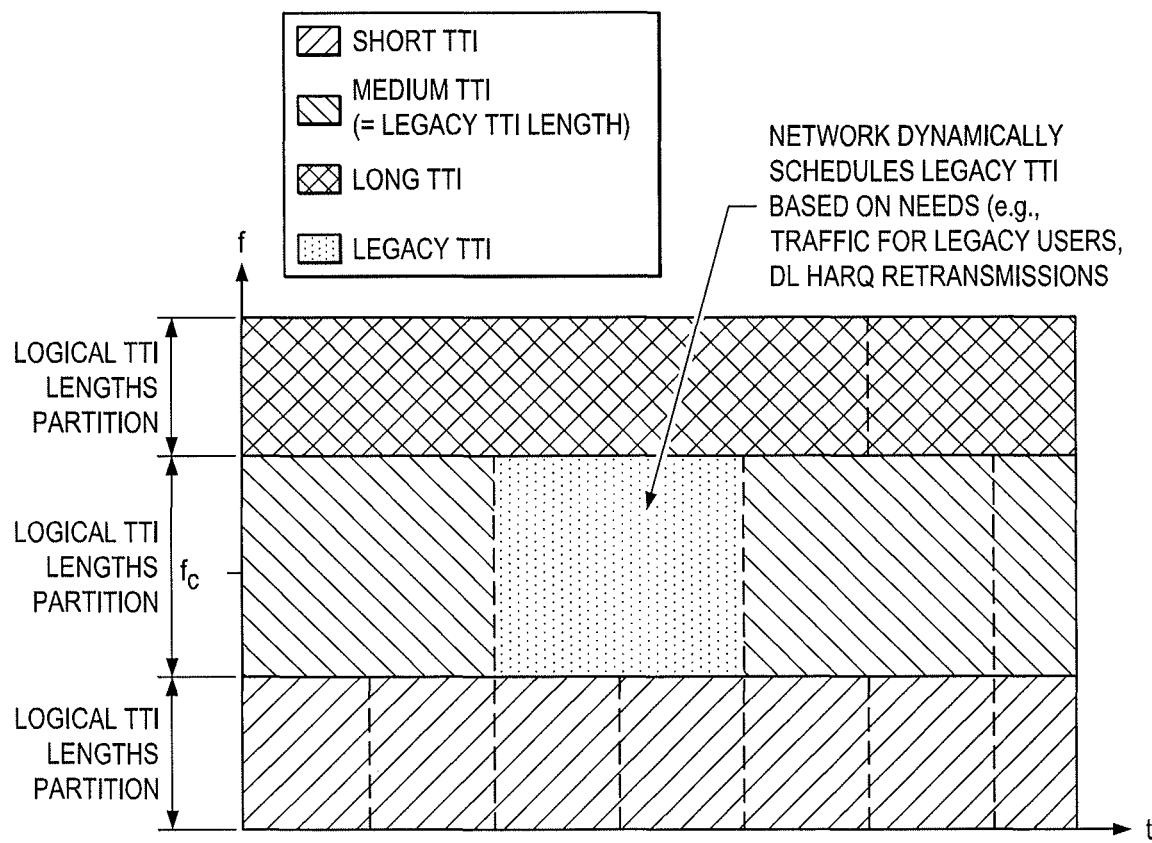
FIG. 3 illustrates an embodiment of a flexible intra-carrier coexistence mechanism for adaptive TTI.

FIG. 3 illustrates an embodiment of a flexible intra-carrier coexistence mechanism for adaptive TTI. In this case, the network dynamically (over time) allocates the legacy TTI according to network and traffic needs. The legacy TTI duration can be included in a set of TTI lengths defined in the adaptive TTI system. For example, the adaptive TTI lengths are 0.5 ms, 1 ms, and 5 ms, where 1 ms TTI is the same as the legacy system. The legacy UEs can also monitor the PDCCH/ePDCCH over the advertised system bandwidth, $B_L$, at every legacy TTI interval.

In this scenario, the network treats the entire system (including LTE and 5G terminals) as an adaptive TTI system. The network can dynamically schedule legacy TTI users by scheduling a legacy TTI centered around $f_c$, and placing a PDCCH within the resource blocks (RBs) and/or RB groups (RBGs) of legacy users. The network assignment of the ePDCCH's physical RBs (PRBs) can be confined to the PRBs in the legacy TI length. Under the LTE standard, the ePDCCH PRB assignment (e.g., via radio resource control (RRC) signaling) is fully flexible. A distributed ePDCCH set can also be confined to the PRB-pairs within the set. For 5G terminals, the TTIs can be treated as an adaptive TTI with its own bandwidth partitioning, where the legacy TTI length is a subset of the adaptive TTI lengths.

Figure 4:
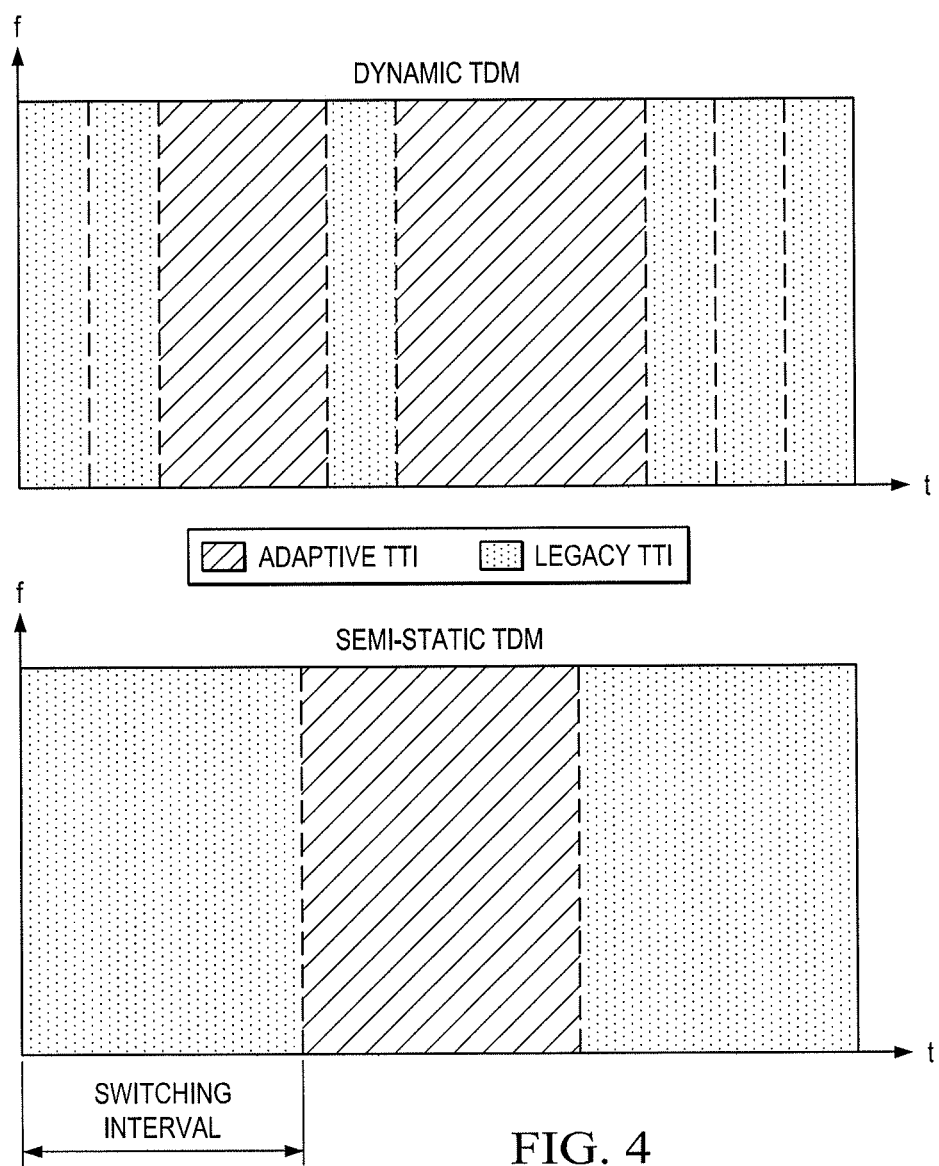
FIG. 4 illustrates an embodiment of intra-carrier coexistence mechanism for adaptive TTI using time division multiplexing (TDM)

FIG. 4 illustrates an embodiment of intra-carrier coexistence mechanism for adaptive TTI using time division multiplexing (TDM). To allow dynamic TDM, the adaptive TTI and legacy TTI coexist in a dynamic manner determined by the network. The legacy UEs can decode the PDCCH/ePDCCH according to the legacy TI interval. The time division for adaptive TTI is transparent to the legacy UEs as they will fail to decode the control channels during such time. The 5G UEs can decode the associated adaptive TTI control channels according to the TTI timing configured by the system. During a particular TTI duration, if the network schedules the legacy TTI, the legacy TTI becomes transparent to the 5G UEs as they will fail to decode the control channels. Delays, however, can be incurred by legacy UEs when there is a long TI configured in the system.

For semi-static TDM, a switching interval or switching patterns can be defined for both LTE and 5G systems. For instance, a switching interval between adaptive TTI and legacy TTI frames should not be made too short. Otherwise the benefit of adaptive TTI may decrease. For example, there may only be several long TTIs before the system switches back to the legacy TTIs. If the switching interval is too long and there are delay sensitive packets for 5G terminals, while the system is in legacy mode, then the 5G terminals can be served in the legacy TTI duration. A similar approach can be implemented for legacy terminals.

Figure 5:
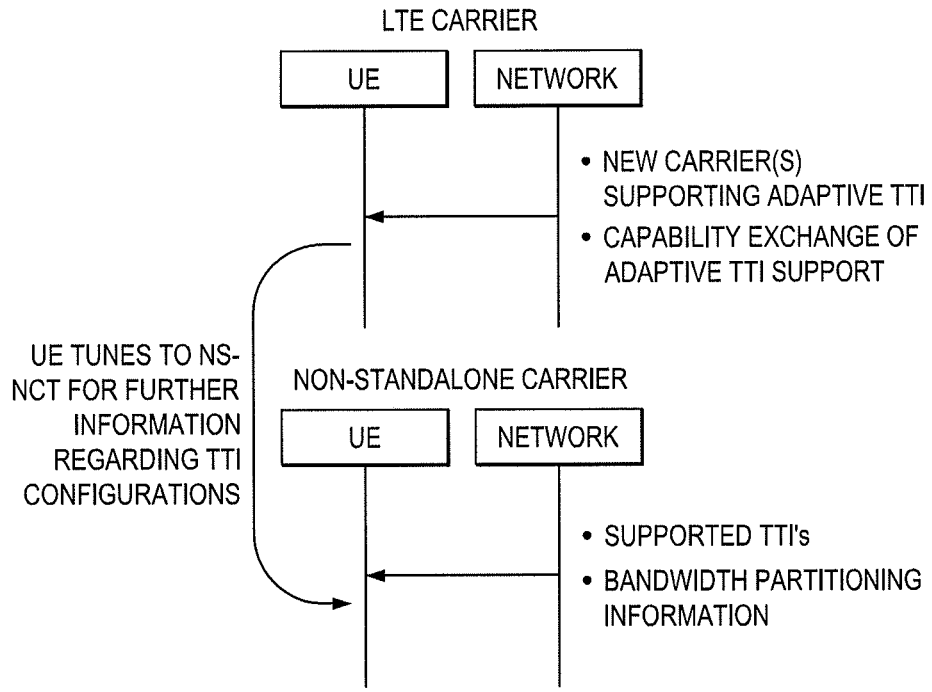
FIG. 5 illustrates an embodiment of an adaptive TTI inter-carrier coexistence mechanism.

FIG. 5 illustrates an embodiment of an adaptive TTI inter-carrier coexistence mechanism, which provides coexistence in a new carrier type, referred to as non-standalone carrier. The non-standalone carrier allows both an adaptive TTI and LTE TTI. The legacy LTE carrier provides signaling of necessary adaptive TTI parameters to direct 5G terminals to the new carrier. Preferably, the signaling of all adaptive TTI parameters in the legacy LTE carrier is avoided to reduce overhead. The 5G terminals can then use the parameters to tune to (search for) the non-standalone carrier. The non-standalone carrier provides the 5G terminals the signaling of detailed adaptive TTI parameters and the intra-carrier coexistence mechanism applied.

In another embodiment for inter-carrier coexistence, an adaptive TTI system can coexist as a new carrier type (NCT) with a legacy TTI system, referred to as backward compatible carrier (BCT). For the configuration of adaptive TTI, which can be common to NCT or same bandwidth coexistence, a capability exchange of adaptive TTI support can be established between the network and terminals. The capability exchange of adaptive TTI support between the network and terminals allows identifying the terminals' capability. As such, the network can configure adaptive TTI capable terminals with additional TTI lengths (e.g., based on traffic types, channel conditions, etc.). Not all 5G terminals may be expected to support adaptive TTI. For example, low cost terminals and/or terminals supporting only specific traffic type may not support adaptive TTI. The capability exchange may be established using any suitable signaling scheme, such as RRC signaling between a UE and the network and/or broadcast signaling, e.g., using system information blocks (SIBs)) from the network.

The supported TTIs of the system can include a predefined set of TTI lengths (e.g., 0.5 ms, 1 ms, 5 ms) in the standard, where no explicit signaling is required. Alternatively, the supported TTIs of the system can include a predefined maximum number of supported TTI lengths, where the values of the TTI lengths can be changed (e.g., via software update). The TTI lengths can be configured for the terminals (e.g., terminal-specific based on traffic, channel conditions, etc.) via unicast/multicast control signaling. Bandwidth partitioning information can be sent via broadcast control signaling. Procedures for coexistence with network signaling (NS) and NCT may include redirection to the NCT that supports adaptive TTI, and an intra-carrier coexistence mechanism in the NCT.

Figure 6:
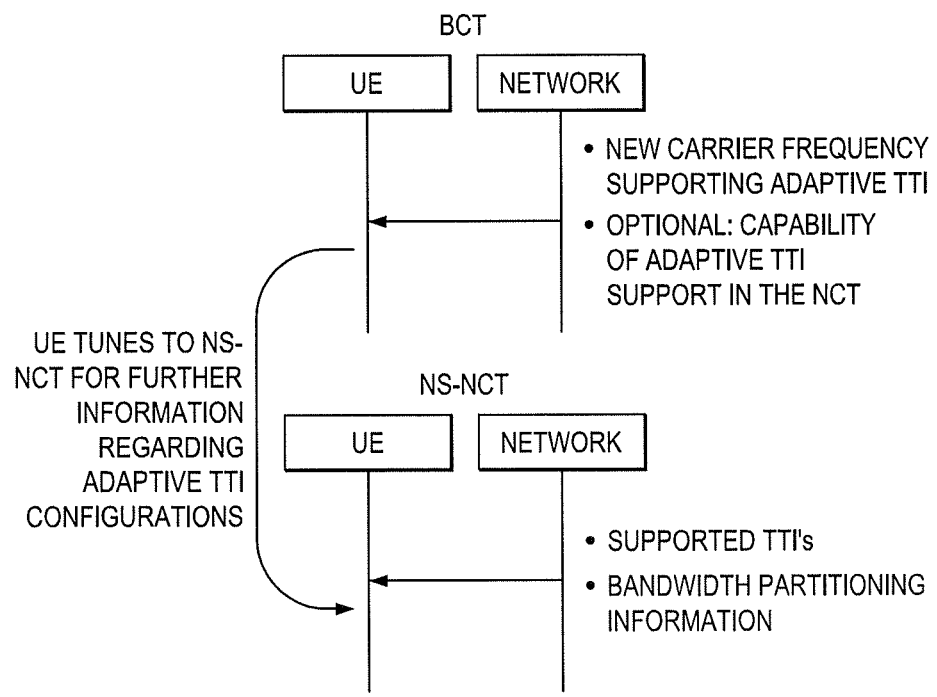
FIG. 6 illustrates an embodiment of an adaptive TTI inter-carrier coexistence mechanism using network signaling (NS) and new carrier type (NCT)

FIG. 6 illustrates an embodiment of an adaptive TTI inter-carrier coexistence mechanism using NS and NCT. The mechanism includes BCT procedures and NS-NCT procedures. In order to reduce the overhead in BCT, the network procedures for BCT include the network providing the necessary parameters for terminals to look for the new carrier(s) that support adaptive TTI. The network signals the new carrier that supports adaptive TTI. In a first option, the network signals the terminals, via unicast/multicast control signaling, the new carrier that supports adaptive TTI as part of the 5G access procedures. This can be applicable in the case of small number of terminals supporting adaptive TTI. In a second option, the network broadcasts the support of adaptive TTI and the new carrier that supports it. This may be more suitable with a large number of terminals supporting adaptive TTI.

The network procedures for NS-NCT include the network providing the detailed parameters for adaptive TTI configurations to 5G UEs. The network can broadcasts the adaptive TI parameters (e.g., for bandwidth partitioning). In the procedures for NS-NCT, the network can unicast/multicast TTI lengths to terminals. Procedures for the 5G terminals include the terminals obtaining information on support of adaptive TTI in the system and the new carrier that supports it. The terminals then tune to the NS-NCT and obtain adaptive TTI system parameters.

Figure 7:
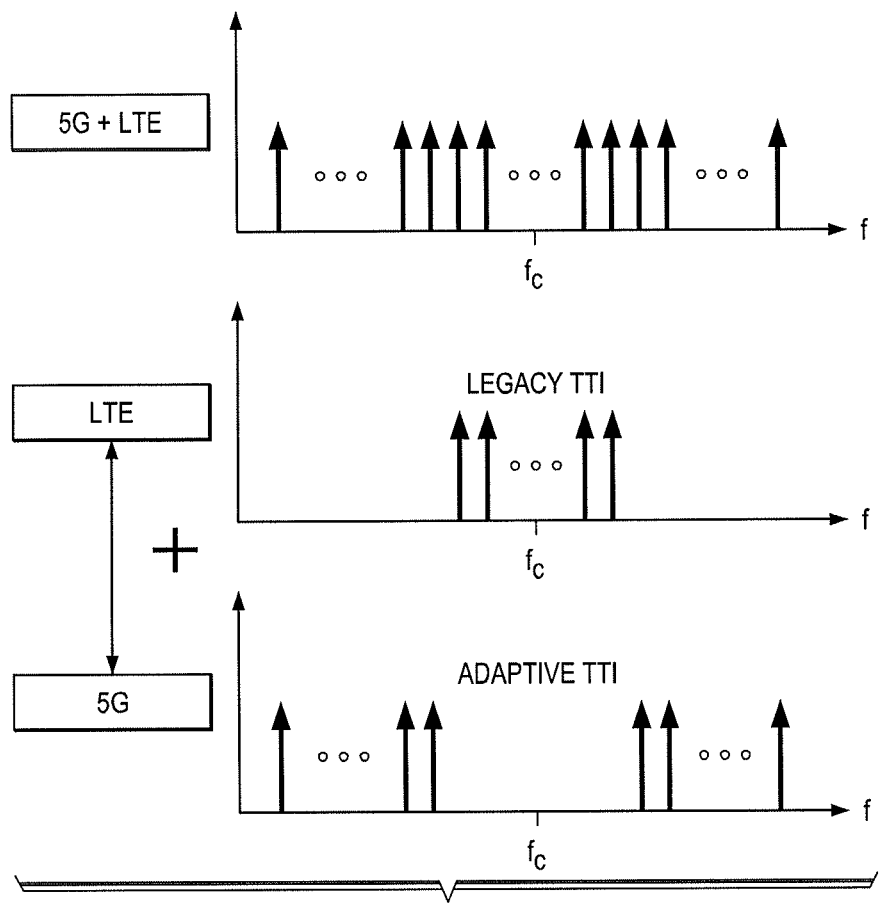
FIG. 7 illustrates an embodiment downlink coexistence scenario for adaptive TTI.
Figure 8:
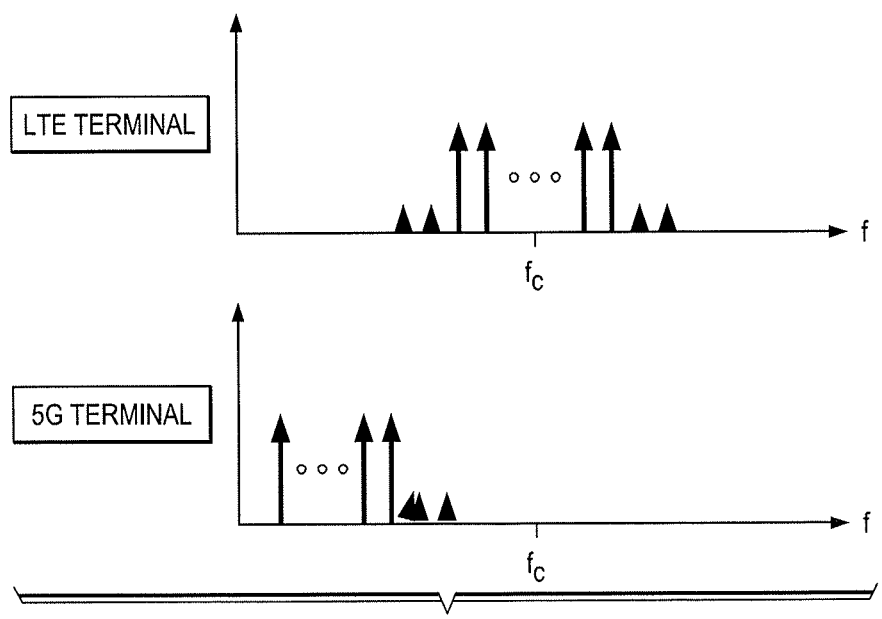
FIG. 8 illustrates an embodiment uplink coexistence scenario for adaptive TTI.

FIG. 7 illustrates an embodiment of a 5G and LTE coexistence scenario for the downlink. The scenario shows the legacy TTI allocated in a bandwidth portion around the carrier frequency, $f_c$. The adaptive TTIs are allocated outside this bandwidth portion on both sides of the carrier frequency. FIG. 8 illustrates embodiment of a 5G and LTE coexistence scenario for the uplink. As in the downlink case, the uplink coexistence scenario shows the legacy TTI allocated in a bandwidth portion around the carrier frequency, $f_c$. The adaptive TTIs are allocated outside this bandwidth portion on at least one side of the carrier frequency. Additionally, guard subcarriers may be used between the two portions, e.g., depending on various resource allocation issues.

Figure 9:
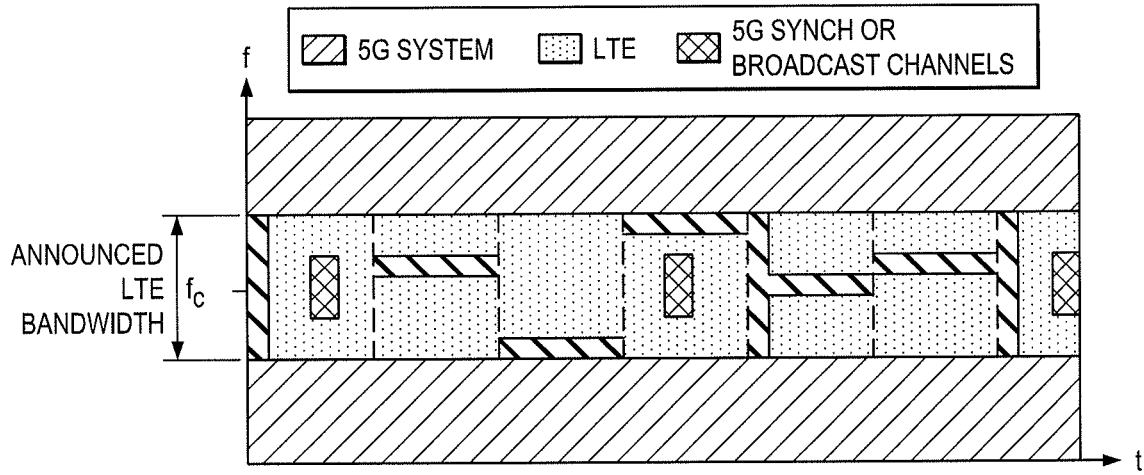
FIG. 9 illustrates an embodiment of an adaptive TTI coexistence scenario for 5G and LTE systems.

FIG. 9 illustrates an embodiment of an adaptive TTI coexistence scenario for 5G and LTE systems. Accordingly, when 5G and LTE systems coexist, some 5G control channels may exist in the LTE partition of the system bandwidth. Therefore, the LTE system may need to avoid scheduling data or control in those resources, in order to allow the 5G terminals to acquire the 5G control channels.

In the various embodiments above, bandwidth partitioning information can be sent via broadcast control signaling. The effective LTE TTI bandwidth can be sent in LTE system information messages. The actual system bandwidth can be sent in the adaptive TTI system. The system may use periodic or event-driven signaling of bandwidth partition information of adaptive TTIs and non-adaptive TTIs.

Further, in various embodiments, legacy system cell bandwidth for downlink (DL) and uplink (UL) can include LTE DL cell bandwidth, which can be obtained via a master information block (MIB) in a broadcast channel (BCH). The MIB can contain DL bandwidth in units of RBs (e.g., 6, 15, 25, 50, 75, 100), a physical hybrid-automatic repeat request (ARQ) indicator channel (PHICH) configuration (determines how many PHICH groups, and hence resources, are in the TTI), and a system frame number (the radio frame number). The BCH can occur at first four orthogonal frequency division multiplexing (OFDM) symbols of the second slot of subframe #0 of each radio frame, and be repeated four times (e.g., repeated every 10 ms), with a 40 ms periodicity. After DL BW is determined from MIB, the UE can start decoding PDCCH and a physical downlink shared channel (PDSCH). For LTE UL cell bandwidth, a SIB2 can be sent in PDSCH, which can contain UL cell bandwidth, RA parameters, and parameters related to UL power control. Further, system information change can be communicated to legacy UEs via a paging procedure (e.g., in both RRC idle and RRC connected states).

Figure 10:
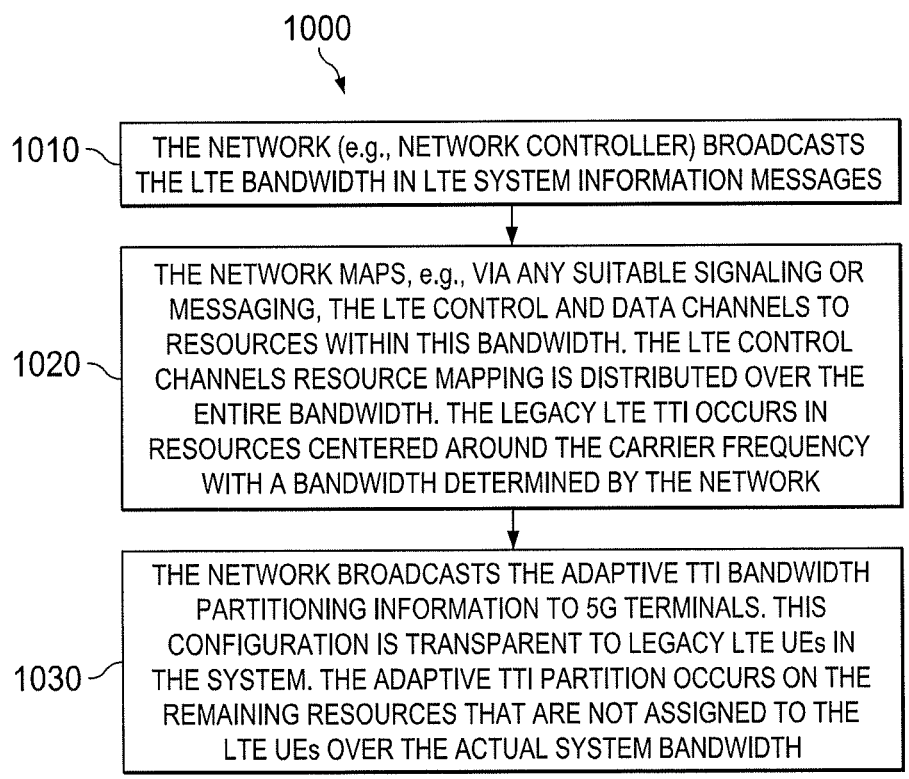
FIG. 10 illustrates an embodiment method for an adaptive TTI intra-carrier coexistence mechanism.

FIG. 10 illustrates an embodiment method for an adaptive TTI intra-carrier coexistence mechanism. At step 1010, the network (e.g., network controller) broadcasts the LTE bandwidth in LTE system information messages. The LTE bandwidth is smaller than the actual system bandwidth, as described above. At step 1020, the network maps, e.g., via any suitable signaling or messaging, the LTE control and data channels to resources within this bandwidth. The LTE control channels resource mapping is distributed over the entire bandwidth. The legacy LTE TTI occurs in resources centered around the carrier frequency with a bandwidth determined by the network. At step 1030, for the adaptive TTI system, the network broadcasts the adaptive TTI bandwidth partitioning information to 5G terminals. This configuration is transparent to legacy LTE UEs in the system. The adaptive TTI partition occurs on the remaining resources that are not assigned to the LTE UEs over the actual system bandwidth. Any 5G terminals that do not support adaptive TTI can be configured with a default TTI length, which can be included in the set of the adaptive TTIs.

Figure 11:
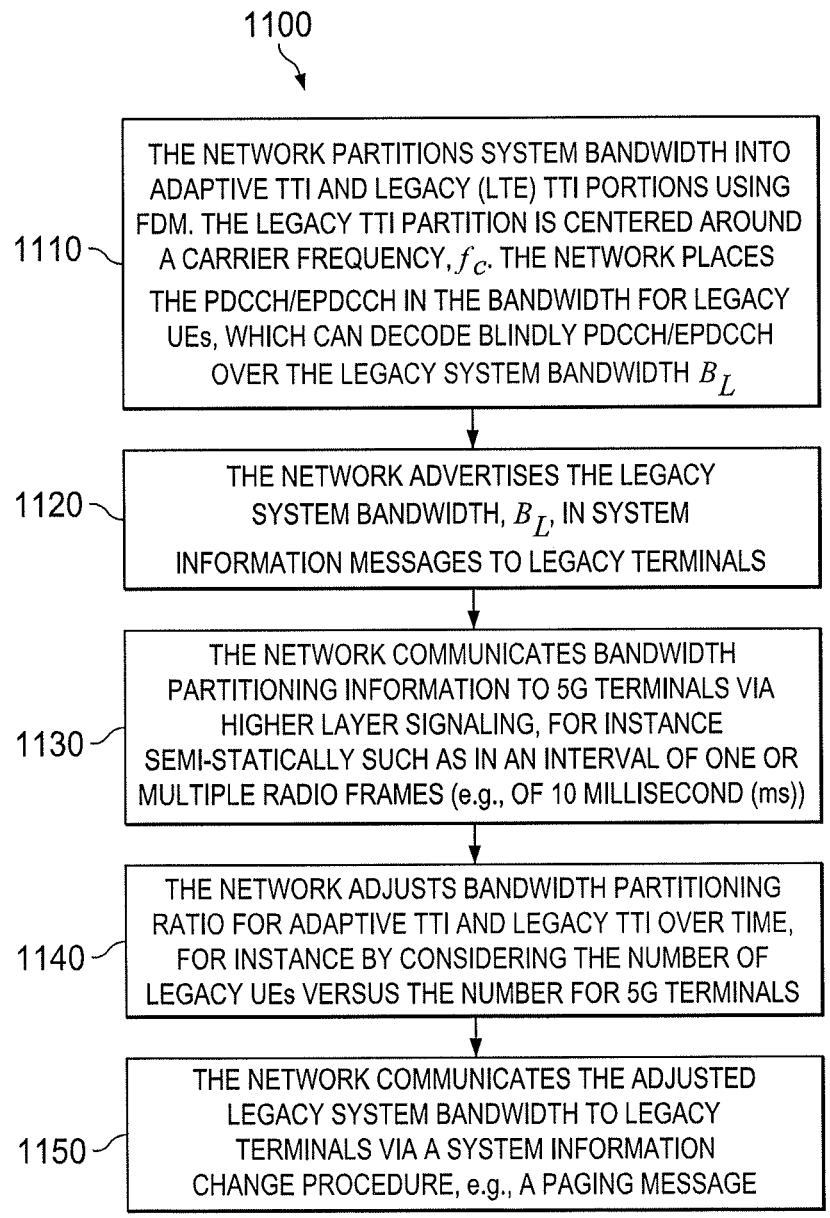
FIG. 11 illustrates an embodiment method for an adaptive TTI intra-carrier coexistence mechanism using FDM.

FIG. 11 illustrates an embodiment method for an adaptive TTI intra-carrier coexistence mechanism using FDM. At step 1110, the network (e.g., a network controller) partitions system bandwidth into adaptive TTI and legacy (LTE) TTI portions using FDM. The legacy TTI partition can be centered around a carrier frequency, $f_c$. The network can place the PDCCH/ePDCCH in the bandwidth for legacy UEs, which can decode blindly PDCCH/ePDCCH over the legacy system bandwidth $B_L$. At step 1120, the network advertises the legacy system bandwidth, $B_L$, in system information messages to legacy terminals. At step 1130, the network communicates bandwidth partitioning information to 5G terminals via higher layer signaling, for instance semi-statically such as in an interval of one or multiple radio frames (e.g., of 10 millisecond (ms)). At step 1140, the network adjusts bandwidth partitioning ratio for adaptive TTI and legacy TTI over time, for instance by considering the number of legacy UEs vs. the number for 5G terminals. At step 1150, the network communicates the adjusted legacy system bandwidth to legacy terminals via a system information change procedure, e.g., a paging message.

Figure 12:
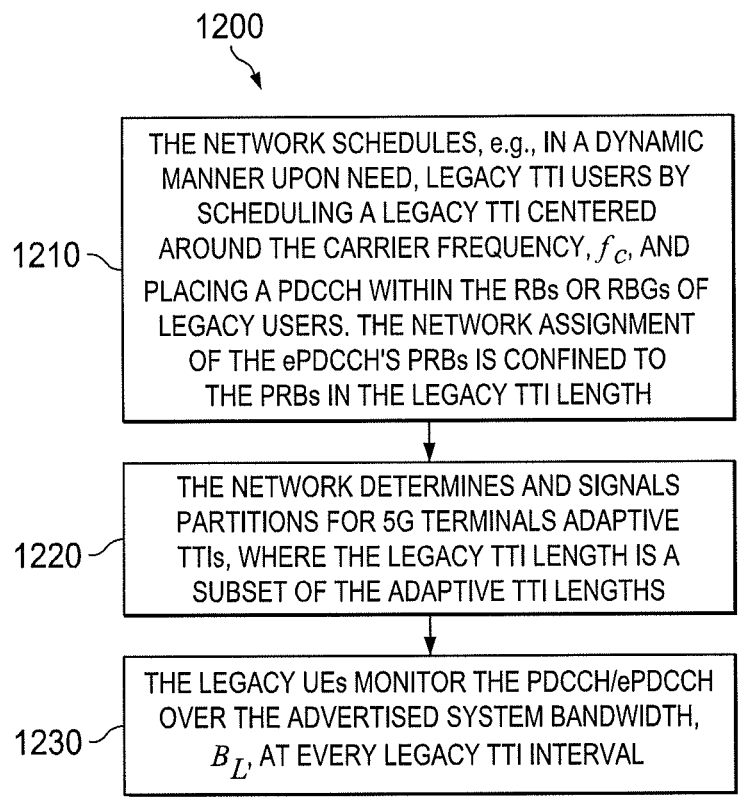
FIG. 12 illustrates an embodiment method for a flexible intra-carrier coexistence mechanism for adaptive TTI.

FIG. 12 illustrates an embodiment method for a flexible intra-carrier coexistence mechanism for adaptive TTI. In this scenario, the network treats the entire system (including LTE and 5G terminals) as an adaptive TTI system. At step 1210, the network schedules, e.g., in a dynamic manner upon need, legacy TTI users by scheduling a legacy TTI centered around the carrier frequency, $f_c$, and placing a PDCCH within the RBs or RBGs of legacy users. The network assignment of the ePDCCH's PRBs can be confined to the PRBs in the legacy TTI length. At step 1220, the network determines and signals partitions for 5G terminals adaptive TTIs, where the legacy TTI length is a subset of the adaptive TTI lengths. At step 1330, the legacy UEs monitor the PDCCH/ePDCCH over the advertised system bandwidth, $B_L$, at every legacy TTI interval.

Figure 13:
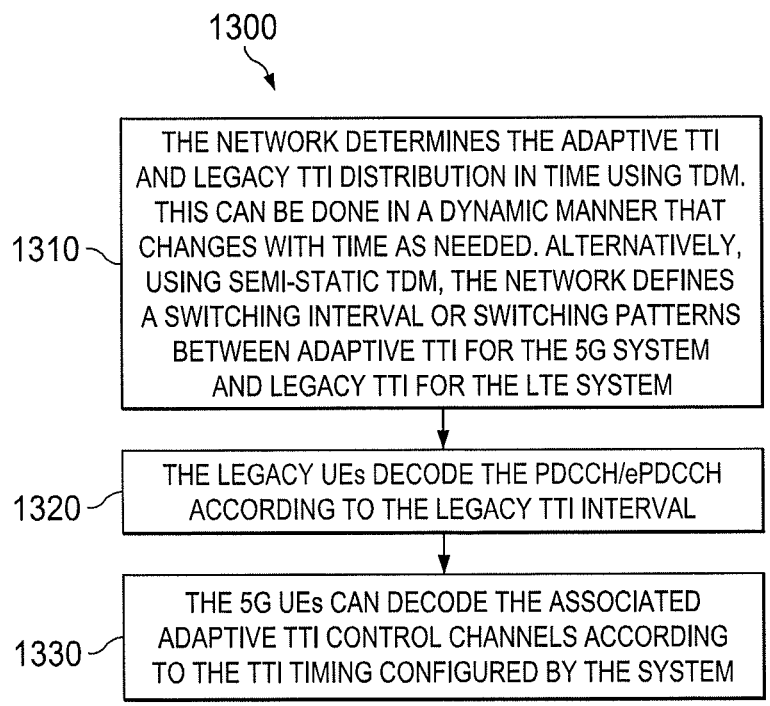
FIG. 13 illustrates an embodiment method for an adaptive TTI intra-carrier coexistence mechanism using TDM.

FIG. 13 illustrates an embodiment method for an adaptive TTI intra-carrier coexistence mechanism using TDM. At step 1310, the network determines the adaptive TTI and legacy TTI distribution in time using TDM. This can be done in a dynamic manner that changes with time as needed. Alternatively, using semi-static TDM, the network defines a switching interval or switching patterns between adaptive TTI for the 5G system and legacy TTI for the LTE system. At step 1320, the legacy UEs decode the PDCCH/ePDCCH according to the legacy TTI interval. At step 1330, the 5G UEs can decode the associated adaptive TTI control channels according to the TTI timing configured by the system. During a particular TTI duration, if the network schedules the legacy TTI, the legacy TTI becomes transparent to the 5G UEs as they will fail to decode the control channels. The time division for adaptive TTI is transparent to the legacy UEs as they will fail to decode the control channels during such time.

Figure 14:
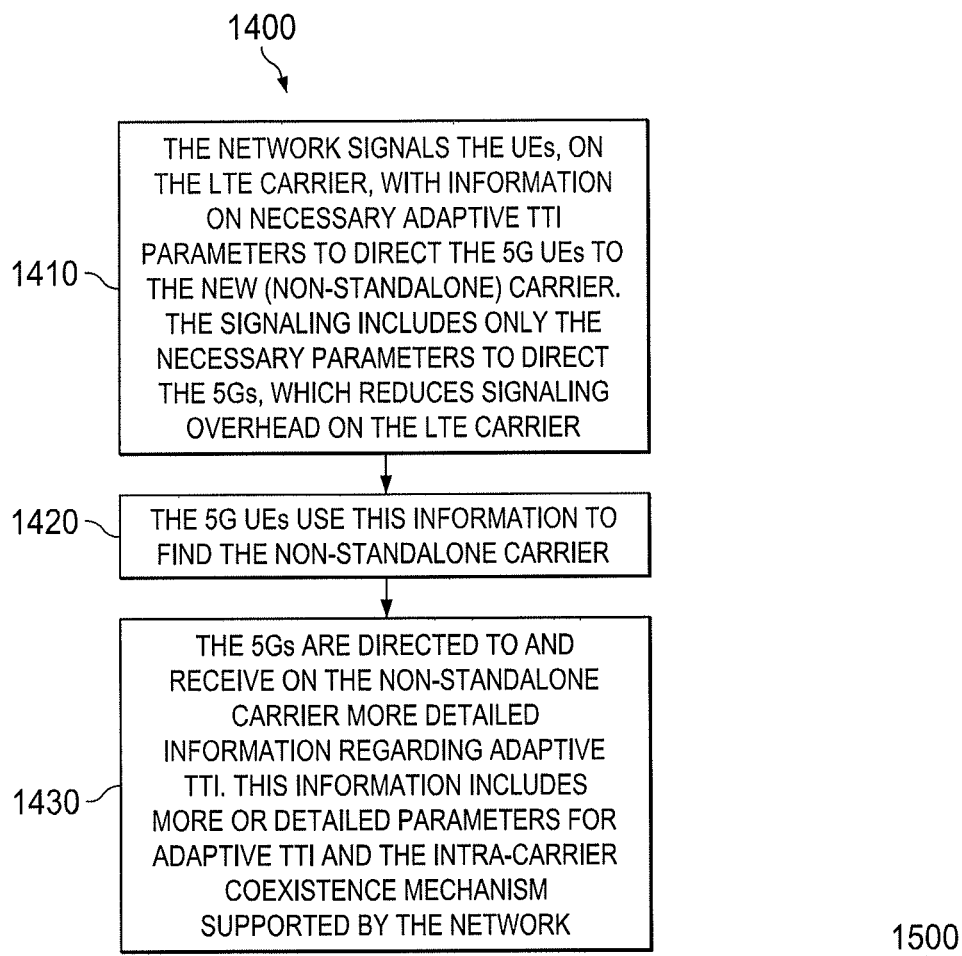
FIG. 14 illustrates an embodiment method for an adaptive TTI inter-carrier coexistence mechanism.

FIG. 14 illustrates an embodiment method for an adaptive TTI inter-carrier coexistence mechanism, which provides coexistence of adaptive TTI and LTE TTI by introducing a new carrier (non-standalone carrier). At step 1410, the network signals the UEs, on the LTE carrier, with information on necessary adaptive TTI parameters to direct the 5G UEs to the new (non-standalone) carrier. The signaling includes only the necessary parameters to direct the 5Gs, which reduces signaling overhead on the LTE carrier. At step 1420, the 5G UEs use this information to find the non-standalone carrier. At step 1430, the 5Gs are directed to and receive on the non-standalone carrier more detailed information regarding adaptive TTI. This information includes more or detailed parameters for adaptive TTI and the intra-carrier coexistence mechanism supported by the network.

Figure 15:
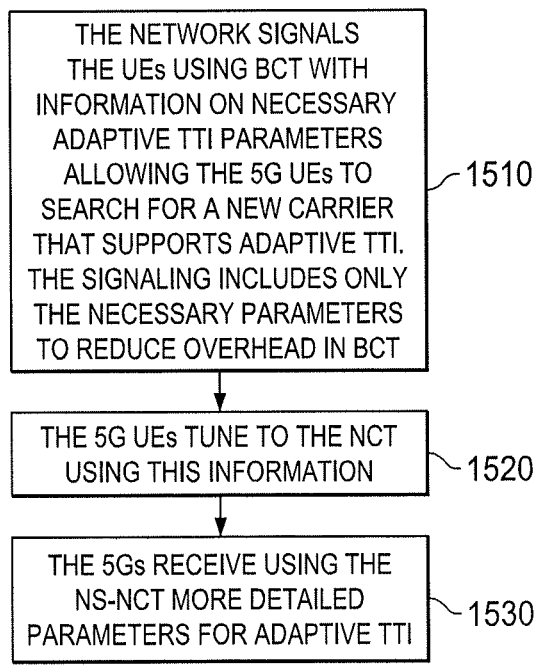
FIG. 15 illustrates another embodiment method for an adaptive TTI inter-carrier coexistence mechanism.

FIG. 15 illustrates another embodiment method for an adaptive TTI inter-carrier coexistence mechanism, which provides coexistence of adaptive TTI and LTE TTI using a NCT. At step 1510, the network signals the UEs using BCT with information on necessary adaptive TTI parameters allowing the 5G UEs to search for a new carrier that supports adaptive TTI. The signaling includes only the necessary parameters to reduce overhead in BCT. At step 1520, the 5G UEs tune to the NCT using this information. At step 1530, the 5Gs receive using the NS-NCT more detailed parameters for adaptive TTI.

Figure 16:
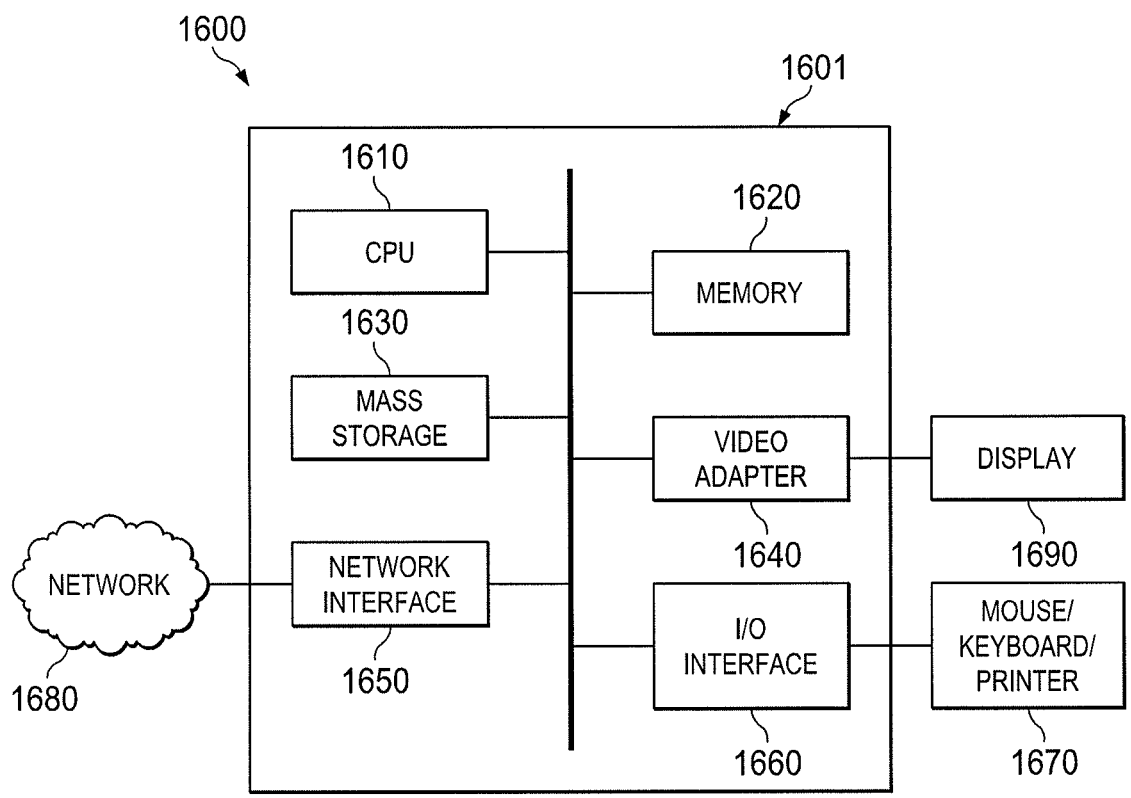
FIG. 16 is a diagram of a processing system that can be used to implement various embodiments.

FIG. 16 is a block diagram of a processing system 1600 that can be used to implement various embodiments and algorithms above. For instance the processing system 1600 can be part of a UE, such as a smart phone, tablet computer, a laptop, or a desktop computer. The system can also be part of a network entity or component that serves the UE, such as a base station or a WiFi access point. The processing system can also be part of a network component, such as a base station. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1600 may comprise a processing unit 1601 equipped with one or more input/output devices, such as a speaker, microphone, mouse, touchscreen, keypad, keyboard, printer, display, and the like. The processing unit 1601 may include a central processing unit (CPU) 1610, a memory 1620, a mass storage device 1630, a video adapter 1640, and an I/O interface 1660 connected to a bus. The bus may be one or more of any type of several bus architectures including a memory bus or memory controller, a peripheral bus, a video bus, or the like.

The CPU 1610 may comprise any type of electronic data processor. The memory 1620 may comprise any type of system memory such as static random access memory (SRAM), dynamic random access memory (DRAM), synchronous DRAM (SDRAM), read-only memory (ROM), a combination thereof, or the like. In an embodiment, the memory 1620 may include ROM for use at boot-up, and DRAM for program and data storage for use while executing programs. In embodiments, the memory 1620 is non-transitory. The mass storage device 1630 may comprise any type of storage device configured to store data, programs, and other information and to make the data, programs, and other information accessible via the bus. The mass storage device 1630 may comprise, for example, one or more of a solid state drive, hard disk drive, a magnetic disk drive, an optical disk drive, or the like.

The video adapter 1640 and the I/O interface 1660 provide interfaces to couple external input and output devices to the processing unit. As illustrated, examples of input and output devices include a display 1690 coupled to the video adapter 1640 and any combination of mouse/keyboard/printer 1670 coupled to the I/O interface 1660. Other devices may be coupled to the processing unit 1601, and additional or fewer interface cards may be utilized. For example, a serial interface card (not shown) may be used to provide a serial interface for a printer.

The processing unit 1601 also includes one or more network interfaces 1650, which may comprise wired links, such as an Ethernet cable or the like, and/or wireless links to access nodes or one or more networks 1680. The network interface 1650 allows the processing unit 1601 to communicate with remote units via the networks 1680. For example, the network interface 1650 may provide wireless communication via one or more transmitters/transmit antennas and one or more receivers/receive antennas. In an embodiment, the processing unit 1601 is coupled to a local-area network or a wide-area network for data processing and communications with remote devices, such as other processing units, the Internet, remote storage facilities, or the like.

In accordance with an embodiment, a method for an adaptive transmission time interval (TTI) coexistence mechanism includes allocating, by a network controller, a long term evolution (LTE) TTI at a first bandwidth. The first bandwidth is smaller than an available system bandwidth and is centered around a carrier frequency at a center of the available system bandwidth. The method further includes allocating adaptive TTIs in the available system bandwidth outside the first bandwidth, and broadcasting adaptive TTI bandwidth partitioning information to adaptive TTI-capable terminals.

In accordance with another embodiment, a network component supporting an adaptive TTI coexistence mechanism comprises at least one processor and a non-transitory computer readable storage medium storing programming for execution by the at least one processor. The programming includes instructions to allocate a LTE TTI at a first bandwidth, wherein the first bandwidth is smaller than an available system bandwidth and is centered around a carrier frequency at a center of the available system bandwidth. The programming includes further instructions to broadcast the first bandwidth in LTE system information messages, allocate adaptive TTIs in the available system bandwidth outside the first bandwidth, and broadcast adaptive TTI bandwidth partitioning information to adaptive TTI-capable terminals.

In accordance with another embodiment, a method for an adaptive TTI coexistence mechanism includes allocating, by a network controller for terminals non-capable of adaptive TTI, a LTE TI at a first time interval in accordance with a time division multiplexing (TDM) scheme, and allocating, for adaptive TTI-capable terminals, adaptive TTIs at a second time interval of the TDM scheme. The first time interval and the second time interval switch consecutively from one to another over time.

In accordance with another embodiment, a network component supporting an adaptive TTI coexistence mechanism comprises at least one processor and a non-transitory computer readable storage medium storing programming for execution by the at least one processor. The programming includes instructions to allocate, for terminals non-capable of adaptive TTI, a LTE TTI at a first time interval in accordance with a TDM scheme, and allocate, for adaptive TTI-capable terminals, adaptive TTIs at a second time interval of the TDM scheme. The first time interval and the second time interval switch consecutively from one to another over time.

In accordance with another embodiment, a method for an adaptive TTI coexistence mechanism includes signaling, in an existing carrier, adaptive TTI parameters used to direct terminals to one or more new carriers that support adaptive TTI, and allocating one or more new carriers for supporting adaptive TTIs. The method further includes signaling, in the one or more new carriers, detailed adaptive TTI parameters to adaptive TTI-capable terminals.

In accordance with another embodiment, a network component supporting an adaptive TTI coexistence mechanism comprises at least one processor and a non-transitory computer readable storage medium storing programming for execution by the at least one processor. The programming includes instructions to signal, in an existing carrier, adaptive TTI parameters used to direct terminals to one or more new carriers that support adaptive TTI, allocate one or more new carriers for supporting adaptive TTIs, and signal, in the one or more new carriers, detailed adaptive TTI parameters to adaptive TTI-capable terminals.

In accordance with another embodiment, a method for an adaptive TTI coexistence mechanism includes receiving, by a user equipment (UE) non-capable of adaptive TTI, in a LTE system message an indication of a first bandwidth allocated for LTE TTI. The first bandwidth is smaller than an available system bandwidth centered around a carrier frequency. The method further includes decoding blindly LTE control and data channels mapped to resources in the first bandwidth, wherein the available system bandwidth is further allocated, outside the first bandwidth, adaptive TTIs for adaptive TTI-capable UEs.

In accordance with another embodiment, a UE comprises at least one processor and a non-transitory computer readable storage medium storing programming for execution by the at least one processor. The programming includes instructions to receive, in a LTE system message, an indication of a first bandwidth allocated for LTE TTI, wherein the first bandwidth is smaller than an available system bandwidth centered around a carrier frequency. The programming includes further instructions to decode blindly LTE control and data channels mapped to resources in the first bandwidth, wherein the UE is non-capable of adaptive TTI, and wherein the available system bandwidth is further allocated, outside the first bandwidth, adaptive TTIs for adaptive TTI-capable UEs.

In accordance with another embodiment, a method for an adaptive TTI coexistence mechanism includes receiving, by an adaptive TTI-capable UE, adaptive TTI bandwidth partitioning information including an allocation of adaptive TTIs in an a available system bandwidth centered around a carrier frequency, wherein the adaptive TTIs are allocated in the available system bandwidth outside a first bandwidth smaller than the available system bandwidth and centered around the frequency carrier, and wherein the first bandwidth is allocated for a LTE TTI for UEs non-capable of adaptive TTI. The method further includes decoding control and data channels mapped to resources in the adaptive TTIs outside the first bandwidth.

In accordance with another embodiment, a UE comprises at least one processor and a non-transitory computer readable storage medium storing programming for execution by the at least one processor. The programming includes instructions to receive adaptive TTI bandwidth partitioning information including an allocation of adaptive TTIs in an a available system bandwidth centered around a carrier frequency, wherein the adaptive TTIs are allocated in the available system bandwidth outside a first bandwidth smaller than the available system bandwidth and centered around the frequency carrier, and wherein the first bandwidth is allocated for a LTE TTI for UEs non-capable of adaptive TTI. The programming includes further instructions to decode control and data channels mapped to resources in the adaptive TTIs outside the first bandwidth, wherein the UE is an adaptive TTI-capable UE.

In accordance with another embodiment, a method for an adaptive TTI coexistence mechanism includes receiving, by a user equipment, a first signaling in an existing carrier, the first signaling indicating adaptive TTI parameters used to direct terminals to one or more new carriers that support adaptive TTI, and tuning to the one or more new carriers. The method further includes receiving a second signaling in the one or more new carriers, the second signaling indicating detailed adaptive TTI parameters, wherein the UE is an adaptive TTI-capable terminal.

In accordance with yet another embodiment, a UE comprises at least one processor and a non-transitory computer readable storage medium storing programming for execution by the at least one processor. The programming includes instructions to receive a first signaling in an existing carrier. The first signaling indicates adaptive TTI parameters used to direct terminals to one or more new carriers that support adaptive TI. The programming further includes instructions to tune to the one or more new carriers, and receive a second signaling in the one or more new carriers. The second signaling indicates detailed adaptive TTI parameters, wherein the UE is an adaptive TTI-capable terminal.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for wireless communications, the method comprising:
    transmitting, by a base station, higher layer signaling comprising bandwidth partitioning information for indicating a non-long term evolution (LTE) bandwidth partition of a system bandwidth;
    transmitting, by the base station, control signaling for indicating a first transmission time interval (TTI) length different from an LTE TTI length; and
    transmitting or receiving, by the base station during a first time duration and in the non-LTE bandwidth partition, a first orthogonal frequency division multiplexing (OFDM) signal according to the first TTI length,
    wherein a ratio of the non-LTE bandwidth partition to an LTE bandwidth partition of the system bandwidth can be adjusted by the base station.

2. The method of claim 1, further comprising:
    transmitting, by the base station during the first time duration and in the LTE bandwidth partition, a second OFDM signal according to the LTE TTI length.

3. The method of claim 1, further comprising:
    transmitting, by the base station during a second time duration and in the LTE bandwidth partition, a second OFDM signal according to the LTE TTI length.

4. The method of claim 1, further comprising:
    transmitting, by the base station, second control signaling for indicating a second TTI length different from the first TTI length and the LTE TTI length; and
    transmitting or receiving, by the base station during the first time duration and in the non-LTE bandwidth partition, a second OFDM signal according to the second TTI length.

5. The method of claim 1, wherein the bandwidth partitioning information is first bandwidth partitioning information, and the method further comprises:
    transmitting, by the base station, the higher layer signaling comprising second bandwidth partitioning information for adjusting the ratio of the non-LTE bandwidth partition to the LTE bandwidth partition in a second time duration.

6. The method of claim 5, wherein the first time duration and the second time duration are indicated by a switching interval parameter.

7. The method of claim 1, wherein the LTE bandwidth partition is within the non-LTE bandwidth partition or the LTE bandwidth partition is adjacent to the non-LTE bandwidth partition.

8. A base station comprising:
    at least one processor; and
    a non-transitory computer readable storage medium storing programming for execution by the at least one processor, the programming including instructions to:
        transmit higher layer signaling comprising bandwidth partitioning information for indicating a non-long term evolution (LTE) bandwidth partition of a system bandwidth;
        transmit control signaling for indicating a first transmission time interval (TTI) length different from an LTE TTI length; and
        transmit or receive, during a first time duration and in the non-LTE bandwidth partition, a first orthogonal frequency division multiplexing (OFDM) signal according to the first TTI length,
        wherein a ratio of the non-LTE bandwidth partition to an LTE bandwidth partition of the system bandwidth can be adjusted by the base station.

9. The base station of claim 8, wherein the programming further includes instructions to:
    transmit, during the first time duration and in the LTE bandwidth partition, a second OFDM signal according to the LTE TTI length.

10. The base station of claim 8, wherein the programming further includes instructions to:
    transmit, during a second time duration and in the LTE bandwidth partition, a second OFDM signal according to the LTE TTI length.

11. The base station of claim 8, wherein the programming further includes instructions to:
    transmit second control signaling for indicating a second TTI length different from the first TTI length and the LTE TTI length; and
    transmit or receive, during the first time duration and in the non-LTE bandwidth partition, a second OFDM signal according to the second TTI length.

12. The base station of claim 8, wherein the bandwidth partitioning information is first bandwidth partitioning information, and the programming further includes instructions to:
    transmit the higher layer signaling comprising second bandwidth partitioning information for adjusting the ratio of the non-LTE bandwidth partition to the LTE bandwidth partition in a second time duration.

13. The base station of claim 12, wherein the first time duration and the second time duration are indicated by a switching interval parameter.

14. The base station of claim 8, wherein the LTE bandwidth partition is within the non-LTE bandwidth partition or the LTE bandwidth partition is adjacent to the non-LTE bandwidth partition.

15. A method for wireless communications, the method comprising:
receiving, by an apparatus from a base station, higher layer signaling comprising bandwidth partitioning information for indicating a non-long term evolution (LTE) bandwidth partition of a system bandwidth;
receiving, by the apparatus to the base station, control signaling for indicating a first transmission time interval (TTI) length different from an LTE TTI length; and
transmitting or receiving, by the apparatus during a first time duration and in the non-LTE bandwidth partition, a first orthogonal frequency division multiplexing (OFDM) signal to or from the base station, according to the first TTI length,
wherein a ratio of the non-LTE bandwidth partition to an LTE bandwidth partition of the system bandwidth can be adjusted by the base station.

16. The method of claim 15, further comprising:
receiving, by the apparatus, second control signaling for indicating a second TTI length different from the first TTI length and the LTE TTI length; and
transmitting or receiving, by the apparatus during the first time duration and in the non-LTE bandwidth partition, a second OFDM signal according to the second TTI length.

17. The method of claim 15, wherein the bandwidth partitioning information is first bandwidth partitioning information, and the method further comprises:
receiving, by the apparatus, the higher layer signaling comprising second bandwidth partitioning information for adjusting the ratio of the non-LTE bandwidth partition to the LTE bandwidth partition in a second time duration.

18. The method of claim 17, wherein the first time duration and the second time duration are indicated by a switching interval parameter.

19. The method of claim 15, wherein the LTE bandwidth partition is within the non-LTE bandwidth partition or the LTE bandwidth partition is adjacent to the non-LTE bandwidth partition.

20. An apparatus comprising:
at least one processor; and
a non-transitory computer readable storage medium storing programming for execution by the at least one processor, the programming including instructions to:
receive, from a base station, higher layer signaling comprising bandwidth partitioning information for indicating a non-long term evolution (LTE) bandwidth partition of a system bandwidth;
receive, from the base station, control signaling for indicating a first transmission time interval (TTI) length different from an LTE TTI length; and
transmit or receive, during a first time duration and in the non-LTE bandwidth partition, a first orthogonal frequency division multiplexing (OFDM) signal to or from the base station, according to the first TTI length,
wherein a ratio of the non-LTE bandwidth partition to an LTE bandwidth partition of the system bandwidth can be adjusted by the base station.

21. The apparatus of claim 20, wherein the programming further includes instructions to:
receive second control signaling for indicating a second TTI length different from the first TTI length and the LTE TTI length; and
transmit or receive, during the first time duration and in the non-LTE bandwidth partition, a second OFDM signal according to the second TTI length.

22. The apparatus of claim 20, wherein the bandwidth partitioning information is first bandwidth partitioning information, and the programming further includes instructions to:
receive the higher layer signaling comprising second bandwidth partitioning information for adjusting the ratio of the non-LTE bandwidth partition to the LTE bandwidth partition in a second time duration.

23. The apparatus of claim 22, wherein the first time duration and the second time duration are indicated by a switching interval parameter.

24. The apparatus of claim 20, wherein the LTE bandwidth partition is within the non-LTE bandwidth partition or the LTE bandwidth partition is adjacent to the non-LTE bandwidth partition.

* * * * *